United States Patent Office 2,718,521
Patented Sept. 20, 1955

2,718,521

PROCESS FOR THE EPIMERIZATION OF PROPANE AMINO DIOLS AND NITRATE ESTERS OBTAINED THEREBY

Basil Jason Heywood, Dagenham, England, assignor, by mesne assignments, to Parke, Davis & Company, Detroit, Mich., a corporation of Michigan No Drawing. Application August 14, 1951,
Serial No. 241,883

Claims priority, application Great Britain
August 25, 1950

15 Claims. (Cl. 260—307)

This invention relates to certain derivatives of organic amino alcohols, being compounds of the formula:

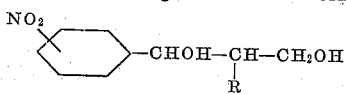

(where R represents an acylamido group such as a lower aliphatic acylamido, a halogen-substituted lower aliphatic acylamido, a benzoylamido or like radical). This structure contains two asymmetric carbon atoms and therefore represents both structural (erythro and threo) and optical isomeric (D- and L-) forms, and the racemates of both structural (i. e. erythro and threo) series.

It is an object of the present invention to provide a process for the epimerisation of the erythro forms of these compounds. A further object, attained according to a preferred feature of this invention, is to provide a commercially useful process for the conversion of the DL- and L-erythro forms of 2-dichloracetamido-1-p-nitrophenylpropane 1:3-diol into the corresponding DL- and D-threo forms, which are therapeutically valuable compounds, the D-threo isomer being the antibiotic known as "Chloramphenicol."

The present invention broadly consists in a process for the epimerisation of the erythro forms of diols having the conventional formula:

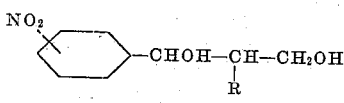

that is to say erythro 2-acylamido-1-nitrophenylpropane 1:3-diols, which process comprises esterifying an optical isomer or racemate of the erythro form of such a diol to form the 1:3-di-nitric ester thereof, treating the di-ester with alkali under conditions favouring the selective hydrolysis of the 1-ester group (as opposed to removal of both ester groups) with simultaneous cyclisation to an oxazoline, treating the oxazoline reaction product with an acid thereby to bring about fission of the oxazoline ring to form a propanol, treating the propanol reaction product with alkali whereby the 3-ester group is hydrolyzed with simultaneous cyclisation to an oxazoline and treating the resultant oxazoline with an acid thereby to bring about fission of the oxazoline ring and subsequently neutralizing the reaction mixture.

The present invention is especially concerned with the epimerisation of the erythro 2-dichloracetamido-1-p-nitrophenyl 1:3-diol and, in this case, the series of reactions may be represented as follows:

(a) 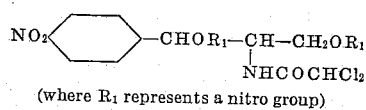

| Nitric acid

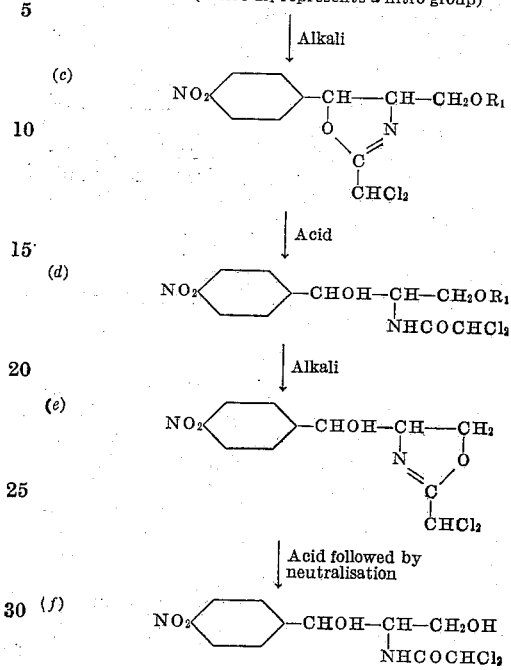

Inversion of structure to the threo form is effected at the stage of formation of the 1:2-oxazoline designated (c) in contradistinction to the formation of the 2:3-oxazoline designated (e).

The initial step of forming the di-nitric ester is effected by treating the erythro diol with nitric acid of specific gravity 1.50 at a temperature around 0° C. and preferably not greater than about 5° C. The second stage, being conversion of the di-ester into oxazoline mono-ester by treatment with alkali, is preferably effected in the cold in solution or suspension in a suitable medium such as aqueous alcohol—conveniently methanol or ethanol. Sodium hydroxide is normally the alkali of choice. Fission of the resulting oxazoline e. g. that hereinbefore designated (c), viz. the third stage in the process, is effected, as already indicated, by treatment with acid, preferably a mineral acid such as hydrochloric acid and preferably in the cold.

If it is desired to isolate the resultant product e. g. that hereinbefore designated (d) then the reaction mixture is neutralised with a suitable base and the solid product thus obtained is then treated with alkali under the same conditions as hereinbefore described for the second stage viz. conversion of di-ester into oxazoline monoester. Alternatively, the acid solution resulting from the third stage of the process may be directly treated with excess of alkali with consequent conversion in situ of reaction product of type (d) into hydroxy oxazoline of type (e).

The final stage of the reaction is effected by treatment of the hydroxy oxazoline of type (e) with an acid, preferably in the cold using concentrated hydrochloric acid, and subsequently neutralising the reaction mixture with a suitable base such as ammonia or sodium bicarbonate. Excess of a strong base should be avoided since the resultant diol is sensitive thereto. The step of neutralisation is preferably effected at about room temperature.

The process of the present invention permits ready transformation from the erythro to the threo series. A preferred feature of the present invention, however, consists in treating DL-erythro or L-erythro 2-dichloroacetamido-1-p-nitrophenylpropane 1:3-diol by the process steps hereinbefore described and isolating from the reaction mixture the corresponding DL-threo or D-threo diol respectively. This preferred process renders possible in a comparatively simple and effective manner the preparation of the threo compounds referred to from the DL- and L-erythro forms of 2-amino-1-p-nitrophenylpropane 1:3-diol which are readily convertible into the DL- and L-erythro forms of 2-dichloroacetamido-1-p-nitrophenylpropane 1:3-diol by the process described in the specification of co-pending application Ser. No. 226,290.

The process of the present invention offers a number of commercial advantages. Thus, for example, all of the reaction steps can be readily carried out under mild temperature conditions leading to products relatively uncontaminated with by-products; hence it is convenient, indeed preferred as illustrated in the following examples, to isolate but not to purify intermediates. A further advantage is that high yields are obtainable by this process.

The process of the present invention is illustrated by the following examples:

*Example I*

The finely powered dinitric ester of DL-erythro 2-dichloroacetamido-1-o-nitrophenylpropane 1:3-diol (6.8 g., M. P. 152° C. with decomposition) was suspended in methanol (50 cc.) and 2 N sodium hydroxide solution (10 cc.) was added. After standing for one hour at laboratory temperature the product was more completely precipitated out by the addition of water. The pale yellow solid was filtered off and washed first with dilute acetic acid and then with water. The yield (5.5 g.) was 95% of theory. The melting point was 95–7° C., while the pure material melts at 103° C. The product has the structure:

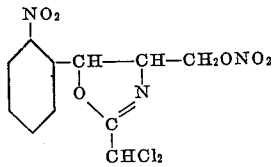

The above material was ground with concentrated hydrochloric acid (90 cc.) and after standing at laboratory temperature for one hour, the solid hydrochloride was filtered off and washed with a little concentrated hydrochloric acid. The damp hydrochloride was suspended in water (50 cc.) and solid sodium bicarbonate was added until the medium became alkaline to litmus. After standing for some time the product (5.6 g.) was filtered off and washed with water. The crude reaction product melted at 127–34° C. (melting point of the pure material is 139–40° C.). It was used as such for the next stage.

The product obtained from the last stage was dissolved in methanol (45 cc.) and 50% w./v. sodium hydroxide (1.45 cc.) added. The solution was maintained at 30–40° C. for two hours during which time the reaction medium became yellow and crystals separated. The suspension was diluted with water and the solid filtered off and washed first with dilute acetic acid and then with water. The melting point was 166° C. while the pure material melts at 169° C. The yield (3.9 g.) was 83% of theory. The product has the structure:

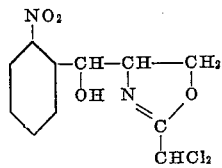

The final stage was to hydrolyse the oxazoline ring with hydrochloric acid by grinding the above material with concentrated hydrochloric acid (9 cc.) and allowing the suspension to stand for ten minutes at laboratory temperature. The excess hydrochloric acid was then neutralised with solid sodium bicarbonate from the diluted reaction mixture. The oil, which was precipitated, solidified on standing at laboratory temperature for four hours. It was filtered off, washed with water and dried. It melted at 116–7° C. while the pure material melts at 121° C. The yield of DL-threo 2-dichloracetamido-1-o-nitrophenylpropane 1:3-diol (3.7 g.) was 89% theory. The overall yield on inversion was 70% of theory.

The dinitric ester starting material was obtained in the following manner:

DL-erythro 5-dichloracetamido-4-phenyl-2-methyl 1:3-dioxan (25 g.) was added over half-an-hour to stirred nitric acid (s. g. 1.50) (75 cc.) cooled to —40° C. The suspension was allowed to stir and warm spontaneously to 0° C. and then held at this temperature for half-an-hour. The resulting solution was poured onto a stirred mixture of crushed ice and water. The solid, so obtained, was filtered off and washed well with water. Two crystallisations from methanol gave pure DL-erythro 2-dichloracetamido-1-o-nitrophenylpropane 1:3-dinitrate, melting point 152° C. with decomposition.

*Example II*

Powdered DL-erythro 2-dichloracetamido-1-p-nitrophenylpropane 1:3-diol (6.46 g.) was added over about 10 minutes to stirred nitric acid (s. g. 1.50) (12.0 cc.) at about —30° C. The nitric acid had been previously treated with sulphamic acid to remove nitrous acid. The reaction mixture was stirred and allowed to warm to +10° C. The resulting colourless clear solution was poured onto stirred ice-water mixture which precipitated the product as a white granular solid. The crude DL-erythro 2-dichloracetamido-1-p-nitrophenylpropane 1:3-diol dinitrate was filtered off, washed with water and dried. The yield of this crude material was 97.5% of theory (8.05 g.) and it melted at 133–6° C., whereas recrystallised material melts at 145–6° C. However, this crude material is sufficiently pure for the next stage.

The crude DL-erythro 2-dichloracetamido-1-p-nitrophenylpropane 1:3-diol dinitrate (4.03 g.) was suspended in methanol (25 cc.) at 10° C. To the stirred suspension was added 2 N sodium hydroxide (6 cc.) which caused the suspension to thin considerably, but after a few minutes the pale yellow cubic crystals of the reaction product were precipitated. The pale yellow suspension was allowed to stand for one hour at 0° C. and the crystals filtered off, washed with a little cold water and then methanol. The crude reaction product was obtained in a 91% of theory yield (3.12 g.) and melted at 101–2° C., whereas the recrystallised product melted at 104–5° C. This product is believed to be DL-threo 2 - dichloromethyl - 4 - hydroxymethyl - 5 - p - nitrophenyl-Δ²-oxazoline nitric ester of the following structure:

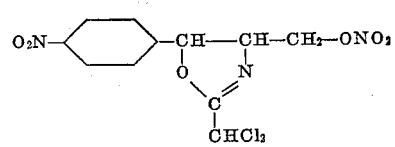

The crude material is sufficiently pure to be employed in the next stage without any further purification. Potassium hydroxide, potassium carbonate, triethylamine, etc., may be employed as the agent to remove the elements of nitric acid, but the yield is not as high as when sodium hydroxide is employed for this purpose.

The crude DL-threo 2 - dichloromethyl - 4 - hydroxymethyl-5-p-nitrophenyl-Δ²-oxazoline nitric ester (3.12 g.) as obtained above was triturated with concentrated hydrochloric acid (20 cc.) and the creamy suspension of the hydrochloride allowed to stand at laboratory temperature for half-an-hour. The solid was filtered off and washed with a few drops of cold concentrated hydrochloric acid. The hydrochloride was resuspended in cold water (40 cc.) and an excess of solid sodium bicarbonate added to render the medium just alkaline. The crude reaction product was filtered off, washed with a little water and air dried. The yield was 98% of theory (3.22 g.). The crude DL-threo 2-dichloracetamido-1-p-nitrophenylpropane 1:3-diol 3-nitric ester melts at 115-20° C., whereas recrystallised material melts at 119° C. This crude material is sufficiently pure for the next stage.

The crude DL-threo 2-dichloracetamido-1-p-nitrophenylpropane 1:3-diol 3-nitric ester (2.46 g.), obtained above was dissolved in methanol (6 cc.) and then 2 N sodium hydroxide (3.5 cc.) added. This solution deposited crystals of DL-threo 2-dichloromethyl-4-p-nitrophenylhydroxymethyl-Δ²-oxazoline on standing at normal temperature for half-an-hour. On standing for 2½ hours the thick suspension was diluted with a little methanol and the pale yellow crystals filtered off and washed with methanol. The crude DL-threo 2-dichloromethyl - 4 - p - nitrophenylhydroxymethyl - Δ² - oxazoline was obtained in a yield of 82% of theory (1.7 g.) and it melted at 159-61° C., whereas the pure oxazoline melts at 162-3° C. The material can be employed without further purification for the next stage.

It is believed to have the structure:

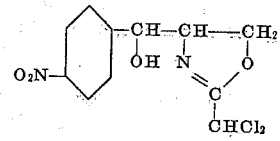

The final stage of the inversion was effected by dissolving the crude DL-threo 2-dichloromethyl-4-p-nitrophenylhydroxymethyl-Δ²-oxazoline (1.5 g.) in cold concentrated hydrochloric acid (5 cc.). After standing for two minutes a crystalline hydrochloride was deposited. After standing for half-an-hour a thick pasty solid was obtained. To facilitate filtration, the mass was diluted with concentrated hydrochloric acid and the hydrochloride filtered off and washed with a little more concentrated acid. The damp hydrochloride was dissolved in the minimum amount of distilled water, filtered, and then neutralised with ammonia or sodium bicarbonate. The suspension was allowed to stand until complete crystallisation had occurred, when the racemic chloramphenicol produced was filtered off and dried. The yield of racemic chloramphenicol was 94.5% of theory (1.50 g.) and had a melting point of 149-50° C. The product has the structure:

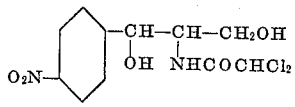

which is the same as that of the starting material except that it belongs to the threo and not erythro series.

The overall yield for the complete sequence of inversion reactions is 68% of theory.

*Example III*

L - erythro 2 - dichloracetamido - 1 - p - nitrophenylpropane 1:3-diol (4 g.; $(\alpha)_D^{26} = -20.6°$ (c.=4% in acetone)) was added to stirred nitric acid (s. g. 1.50) (7.45 cc.) at about —40° C. over about two minutes. The nitric acid had been treated with sulphamic acid to remove traces of nitrous acid. The stirring was continued while the suspension was allowed to warm to 0° C. over about 40 minutes. A complete and colourless solution was obtained at 0° C. and this was then drowned out onto stirred ice and water. After standing overnight, the slightly sticky solid hardened completely; it was filtered off and dried in vacuo. The yield of crude L-erythro 2-dichloracetamido-1-p-nitrophenylpropane 1:3-diol dinitric ester (4.80 g.) was 93.5% of theory. It melted at 126-8° C. and had an optical rotation of +8.92° (c.=4% in acetone).

The crude dinitric ester (3.57 g.), obtained as above, was suspended in methanol (21.0 cc.) at 10° C. and 2 N sodium hydroxide (4.02 cc.) was added. The ester dissolved rapidly and after standing for thirty seconds an oil was deposited. After standing for one hour at 0° C. the supernatant liquor was poured off and replaced by concentrated hydrochloric acid (17.8 cc.). Trituration caused a white hydrochloride to be precipitated out. After standing for half-an-hour the solid was filtered off and washed with a little hydrochloric acid. The hydrochloride was suspended in water and the medium rendered just alkaline to litmus. The D-threo 2 - dichloracetamido - 1 - p - nitrophenylpropane 1:3-diol 3-nitric ester separated as an oil which was converted directly to the oxazoline after removal of the aqueous layer. The oil was dissolved in methanol (6 cc.) and 2 N sodium hydroxide (3.6 cc.) was added which caused the solution to redden somewhat. After standing for 2½ hours at normal temperature, the long pale yellow needles which had been formed were filtered off and washed with a little ice-cold methanol. The crude product, D-threo 2-dichloromethyl-4-p-nitrophenylhydroxymethyl-Δ²-oxazoline melted at 136-9° C. and had an optical rotation of —169.9° (c.=1% in ethyl acetate). Crystallisation from methanol gave material M. P. 140-2° C. and $(\alpha)_D^{20} = -172°$ (c.=1% in ethyl acetate).

The crude oxazoline (0.5 g.) was mixed with concentrated hydrochloric acid (2.5 cc.) and the white suspension, which was rapidly formed, allowed to stand in ice for one hour. The solid was filtered off and washed with concentrated hydrochloric acid (1 cc.). The residue was dissolved in N/2 hydrochloric acid (5 cc.) at 30° C. and the solution filtered. The solution was made just alkaline to litmus by the addition of solid sodium bicarbonate. After concentration under reduced pressure to half volume, the chloramphenicol formed was filtered off, washed with ice cold water and dried in vacuo. The chloramphenicol melted at 150-2° C. and the optical rotation was $(\alpha)_n^4 = -19.81°$ (c.=4% in ethyl acetate).

*Example IV*

DL - erythro 2 - dichloracetamido - 1 - p - nitrophenylpropane 1:3-diol was converted into the dinitrate as described in Example II. The crude DL-erythro 2-dichloracetamido - 1 - p - nitrophenylpropane 1:3-diol dinitrate (2.06 g.) was suspended in methanol (20 cc.) at 10° C. while 2 N sodium hydroxide (2.75 cc.) was added. The white solid re-dissolved and, after one minute, the pale yellow crystals of DL-threo 2-dichloromethyl - 4 - hydroxymethyl - 5 - p - nitrophenyl - Δ²-oxazoline nitric ester separated out. After half-an-hour at 10° C. the suspension was allowed to warm up to laboratory temperature over half-an-hour. The suspension was just alkaline to Brilliant Yellow.

The suspension was made neutral to litmus by the addition of 2 N hydrochloric acid (0.3 cc. were required) and then a further quantity of 2 N hydrochloric acid (2.75 cc.) added. The suspension at first thinned considerably, but subsequently thickened somewhat with the separation of needles of DL-threo 2-dichloracetamido-1-p-nitrophenylpropane 1:3-diol 3-nitric ester. The hydrolysis of this oxazoline was allowed to proceed at laboratory temperature for one hour.

The suspension was neutralised with 2 N sodium hydroxide and then a further equal amount added. The solution was allowed to stand at laboratory temperature overnight during which time the pale yellow crystals of DL-threo 2-dichloromethyl-4-p-nitrophenylhydroxymethyl-Δ²-oxazoline were formed. The suspension was no longer alkaline to Clayton Yellow and a further amount of 2 N sodium hydroxide (0.5 cc.) was added.

The suspension was allowed to stand for one hour further.

At this stage it is sometimes expedient to isolate the oxazoline as this effects an efficient purification since the oxazoline is sparingly soluble in this medium. However, in the present experiment, the orange suspension was neutralised with 2 N hydrochloric acid and then a further amount of 2 N hydrochloric acid (2.5 cc.) added. After shaking for 10 minutes, the solid redissolved to give a cloudy orange solution. The racemic chloramphenicol so obtained was extracted with ethyl acetate and allowed to crystallise from this solvent after concentration and addition of petroleum ether.

I claim:

1. Process for the epimerization of erythro 2-dichloracetamido-1-nitrophenylpropane 1:3-diols wherein an erythro 2 - dichloracetamido - 1 - nitrophenylpropane 1:3 diol is reacted with nitric acid to form an erythro 1:3 dinitrate, said dinitrate is reacted with alkali to obtain a threo 2-dichloromethyl-4-hydroxymethyl-5-nitrophenyl-$\Delta^2$-oxazoline-4-nitrate, said oxazoline nitrate ester is reacted with a mineral acid to obtain a threo 2-dichloracetamido-1-nitrophenylpropane 1:3-diol-3-nitrate, said 3-nitrate ester is reacted with alkali to obtain a threo 2-dichloromethyl - 4 - nitrophenyl - hydroxymethyl - $\Delta^2$-oxazoline, said last mentioned oxazoline is reacted with a mineral acid to obtain a threo 2-amino-1-nitrophenyl-1-dichloracetoxy propane-3-ol acid addition salt and treating said acid addition salt with a base thereby producing a threo 2 - dichloracetamido - 1 - nitrophenyl - 2 - dichloroacetamidopropane-1,3-diol.

2. Process according to claim 1 in which the starting material is in the DL-form.

3. Process according to claim 1 in which the starting material is in the L-form.

4. Process for the production of threo-2-dichloracetamido-1-p-nitrophenylpropane 1:3-diols comprising mixing an erythro 2-dichloroacetamido-1-p-nitrophenylproppane 1:3 diol with nitric acid at a temperature not greater than about 5° C. to effect conversion of said diol to a 1:3- dinitric ester, mixing said dinitric ester with an alkali metal hydroxide in the cold in an aqueous alcoholic medium to effect conversion of said dinitrate to a threo 2-dichloromethyl-4-hydroxymethyl-5 - p-nitrophenyl - $\Delta^2$-oxazoline-4-nitrate, mixing said oxazoline nitrate ester with concentrated hydrochloric acid in the cold to effect conversion of said monoester to a threo 2-dichloroacetamido-1-p-nitrophenylpropane 1:3-diol-3-nitrate, mixing said 3-nitrate ester with an alkali metal hydroxide in the cold in an aqueous alcoholic medium to effect conversion of said 3-nitrate ester to a threo 2-dichloromethyl-4-p-nitrophenyl-hydroxymethyl-$\Delta^2$-oxazoline, and mixing said last mentioned oxazoline with concentrated hydrochloric acid in the cold to effect conversion of said oxazoline to a threo 2-amino-1-p-nitrophenyl-1-dichloroacetoxypropane-3-ol hydrochloride, and neutralizing said hydrochloride with a base, thereby producing a threo-2-dichloroacetamido-1-p-nitrophenylpropane-1,3-diol.

5. Process according to claim 4 in which the starting material is in the D,L-form.

6. Process according to claim 4 in which the starting material is in the L-form.

7. In a process for the epimerization of erythro diols, the step of mixing an erythro 2-dichloracetamido-1-p-nitrophenylpropane 1:3-diol-1:3-dinitrate with an alkali metal hydroxide in a cold aqueous alcoholic medium, thereby producing a threo 2-dichloromethyl-4-hydroxymethyl-5-p-nitrophenyl-$\Delta^2$-oxazoline-4-nitrate.

8. Process which comprises mixing an erythro 2-dichloracetamido-1-p-nitrophenylpropane 1:3-diol with concentrated nitric acid at a temperature not greater than about 5° C. to effect conversion of said diol to an erythro 2-dichloroacetamido-1-p-nitrophenylpropane 1:3 diol-1:3-dinitrate.

9. Process which comprises mixing a threo 2-dichloromethyl-4-hydroxymethyl-5-p-nitrophenyl - $\Delta^2$ - oxazoline-4-nitrate with concentrated hydrochloric acid in the cold and neutralizing the reaction mixture, thereby producing a threo 2-dichloracetamido-1-p-nitrophenylpropane 1:3-diol-3-nitrate.

10. Process which comprises mixing a threo 2-dichloracetamido-1-p-nitrophenylpropane 1:3-diol-3-nitrate with alkali metal hydroxide in a cold aqueous alcoholic medium, thereby converting the said 3-nitrate to a threo 2-dichloromethyl - 4 - p - nitrophenylhydroxymethyl - $\Delta^2$-oxazoline.

11. An erythro 2-dichloracetamido-1-p-nitrophenylpropane 1:3-diol-1:3-dinitrate.

12. A threo 2-dichloromethyl-4-hydroxymethyl-5-p-nitrophenyl-$\Delta^2$-oxazoline-4-nitrate.

13. A threo 2-dichloracetamido-1-p-nitrophenylpropane 1:3-diol-3-nitrate.

14. DL - erythro - 2 - dichloroacetamido - 1 - p - nitrophenylpropane-1,3-diol-1,3-dinitrate.

15. L-erythro-2-dichloroacetamido-1 - p - nitrophenylpropane-1,3-diol-1,3-dinitrate.

References Cited in the file of this patent

UNITED STATES PATENTS

| | | |
|---|---|---|
| 2,513,346 | Moersch et al. | July 4, 1950 |
| 2,562,114 | Moersch et al. | July 24, 1951 |